US010527500B2

(12) United States Patent
Chow et al.

(10) Patent No.: US 10,527,500 B2
(45) Date of Patent: Jan. 7, 2020

(54) IN-SITU THIN FILM BASED TEMPERATURE SENSING FOR HIGH TEMPERATURE UNIFORMITY AND HIGH RATE OF TEMPERATURE CHANGE THERMAL REFERENCE SOURCES

(71) Applicant: RAYTHEON COMPANY, Waltham, MA (US)

(72) Inventors: James R. Chow, San Gabriel, CA (US); Carl W. Townsend, Los Angeles, CA (US); Kurt S. Ketola, Los Angeles, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/170,475

(22) Filed: Oct. 25, 2018

(65) Prior Publication Data
US 2019/0064006 A1    Feb. 28, 2019

Related U.S. Application Data

(62) Division of application No. 14/884,459, filed on Oct. 15, 2015, now Pat. No. 10,139,287.

(51) Int. Cl.
*G01K 7/02* (2006.01)
*G01J 5/52* (2006.01)
*G01K 15/00* (2006.01)

(52) U.S. Cl.
CPC ............... *G01K 7/02* (2013.01); *G01J 5/522* (2013.01); *G01K 7/021* (2013.01); *G01K 15/005* (2013.01)

(58) Field of Classification Search
CPC .......... H01L 21/02606; G01N 27/4146; G01N 27/127; G01N 27/18; G01K 7/02;
(Continued)

(56) References Cited

U.S. PATENT DOCUMENTS 3,006,978 A    10/1961    McGrath et al.
4,378,489 A    3/1983    Chabinsky et al.
(Continued)

FOREIGN PATENT DOCUMENTS

CN    1632484 A    6/2005
CN    1752724 A    3/2006
(Continued)

OTHER PUBLICATIONS

Partial Supplementary European Search Report; EP Application No. 14797386.1; dated Jan. 9, 2017; pp. 1-8.
(Continued)

*Primary Examiner* — Gail Kaplan Verbitsky
(74) *Attorney, Agent, or Firm* — Cantor Colburn LLP (57) ABSTRACT

A thin-film device for generating a blackbody spectrum is disclosed. The device includes first layer configured to generate heat in response to an applied voltage and a second layer configured to generate the blackbody radiation spectrum in response to the heat from the first layer. A thermocouple is disposed between the first layer and the second layer for measuring a temperature at the second layer. The thermocouple measures temperature at the second layer in order to control temperature at the second layer. The thermocouple can be a copper-carbon nanotube thermocouple.

5 Claims, 5 Drawing Sheets

(58) Field of Classification Search
CPC ...... G01K 15/005; G01K 13/00; G01K 7/186; G01K 7/028; G01K 2211/00; G01K 7/00
USPC ........ 977/948; 374/178, 179, 137, 124, 121; 716/30
See application file for complete search history.

(56) References Cited

U.S. PATENT DOCUMENTS

| | | | |
|---|---|---|---|
| 4,440,510 A * | 4/1984 | Stein | G01J 5/52 |
| | | | 219/497 |
| 4,647,783 A | 3/1987 | Verona | |
| 4,750,139 A | 6/1988 | Dils | |
| 5,265,958 A | 11/1993 | Ludlow | G01J 5/522 |
| | | | 250/252.1 |
| 5,560,711 A | 10/1996 | Bu | G01W 1/17 |
| | | | 257/467 |
| 5,690,429 A | 11/1997 | Ng | G01J 5/60 |
| | | | 374/1 |
| 6,004,494 A | 12/1999 | Debe | G01N 27/127 |
| | | | 264/104 |
| 6,072,165 A | 6/2000 | Feldman | |
| 7,837,382 B2 | 11/2010 | Yamada | G01K 15/002 |
| | | | 374/1 |
| 7,866,882 B2 | 1/2011 | Ko | G05D 23/19 |
| | | | 374/1 |
| 8,033,722 B2 | 10/2011 | Kulkarni et al. | |
| 8,568,027 B2 * | 10/2013 | Ivanov | B82Y 30/00 |
| | | | 374/185 |
| 9,086,327 B2 | 7/2015 | Chow et al. | |
| 9,332,593 B2 | 5/2016 | Keite-Telgenbuscher | |
| 9,722,165 B2 * | 8/2017 | Carr | H01L 35/26 |
| 9,917,242 B2 * | 3/2018 | Barnett | H01L 35/32 |
| 10,139,287 B2 * | 11/2018 | Chow | G01K 7/02 |
| 2004/0136434 A1 | 7/2004 | Langley | G01K 17/20 |
| | | | 374/29 |
| 2004/0207845 A1 | 10/2004 | Opsal | |
| 2005/0030628 A1 | 2/2005 | Wagner | G01J 3/108 |
| | | | 359/573 |
| 2006/0048809 A1 * | 3/2006 | Onvural | B82Y 10/00 |
| | | | 136/212 |
| 2006/0256833 A1 | 11/2006 | Jiang | G01K 7/02 |
| | | | 374/5 |
| 2007/0210265 A1 | 9/2007 | Haq et al. | |
| 2008/0036356 A1 | 2/2008 | Ward | |
| 2008/0074847 A1 | 3/2008 | Sueoka et al. | |
| 2009/0152873 A1 * | 6/2009 | Gangopadhyay | C06B 45/14 |
| | | | 290/1 R |
| 2010/0059494 A1 | 3/2010 | Keite-Telgenbuescher | |
| 2010/0108916 A1 | 5/2010 | Barker | |
| 2010/0260229 A1 | 10/2010 | Grubb | |
| 2010/0285210 A1 * | 11/2010 | Choi | B82Y 15/00 |
| | | | 427/125 |
| 2011/0051775 A1 | 3/2011 | Ivanov et al. | |
| 2011/0103424 A1 | 5/2011 | Imholt | |
| 2011/0125444 A1 | 5/2011 | Topham et al. | |
| 2011/0163636 A1 * | 7/2011 | Sirbuly | B82Y 30/00 |
| | | | 310/339 |
| 2011/0186956 A1 * | 8/2011 | Hiroshige | H01B 1/02 |
| | | | 257/467 |
| 2011/0298333 A1 | 12/2011 | Pilon | |
| 2012/0073308 A1 | 3/2012 | Kim | |
| 2012/0199689 A1 | 8/2012 | Burkland | |
| 2013/0043390 A1 | 2/2013 | De Ruyter | |
| 2013/0048884 A1 | 2/2013 | Fainchtein et al. | |
| 2013/0087758 A1 | 4/2013 | Maki et al. | |
| 2013/0153860 A1 | 6/2013 | Kim et al. | |
| 2013/0220990 A1 | 8/2013 | Liu et al. | |
| 2013/0329366 A1 | 12/2013 | Wang et al. | |
| 2014/0023116 A1 * | 1/2014 | Ivanov | B82Y 30/00 |
| | | | 374/183 |
| 2014/0292357 A1 | 10/2014 | Chai | |
| 2015/0076373 A1 | 3/2015 | Chow et al. | |
| 2016/0211433 A1 | 7/2016 | Kano | |
| 2016/0240762 A1 * | 8/2016 | Carr | H01L 35/26 |
| 2016/0305829 A1 * | 10/2016 | Emadi | G01J 5/0881 |
| 2017/0327377 A1 | 11/2017 | Zhang | B82Y 10/00 |

FOREIGN PATENT DOCUMENTS

| | | |
|---|---|---|
| CN | 102122647 A | 7/2011 |
| EP | 2043406 A2 | 4/2009 |
| GB | 2451572 A | 2/2009 |
| JP | H0729427 U | 6/1995 |
| JP | H08054285 A | 2/1996 |
| JP | 2010192581 A | 9/2010 |
| JP | 2011064513 A | 3/2011 |
| JP | 2011103293 A | 5/2011 |
| JP | 2012154777 A | 8/2012 |
| JP | 2014204122 A | 10/2014 |
| JP | 2015070250 A | 4/2015 |
| KR | 20130106932 A | 10/2013 |
| WO | 2005026674 A2 | 3/2005 |
| WO | 2014176185 A | 3/2011 |
| WO | 2014186026 A1 | 11/2014 |
| WO | 2015050113 A1 | 4/2015 |

OTHER PUBLICATIONS

Konz et al.; "Micromachined IR-source with excellent blackbody like behaviour", Invited Paper, Proceedings of SPIE vol. 5836, Jul. 1, 2005, pp. 540-548.
Orofeo et al., "Synthesis of Large Area, Homogeneous, Single Layer Graphene Films by Annealing Amorphous Carbon on Co and Ni", Nano Res. 2011, 4(6): pp. 531-540.
PCT International Search Report and Written Opinion; International Application No. PCT/US2015/060526; International Filing Date: Nov. 13, 2015; dated Mar. 7, 2016; pp. 1-15.
PCT International Search Report and Written Opinion; International Application No: PCT/US2016/046961; International Filing Date: Aug. 15, 2016; dated Dec. 14, 2016; pp. 1-16.
E. Pop, et al.; "Thermal properties of Graphene: Fundamentals and applications," MRS Bulletin, Materials Research Society, vol. 37, Dec. 2012, pp. 1273-1281.
International Search Report for International Application No. PCT/US2014/018928; International Filing Date Feb. 27, 2014; dated Aug. 11, 2014, pp. 1-7.
Written Opinion for International Application No. PCT/US2014/018928; International Filing Date Feb. 27, 2014; dated Aug. 11, 2014, pp. 1-7.

* cited by examiner

IN-SITU THIN FILM BASED TEMPERATURE SENSING FOR HIGH TEMPERATURE UNIFORMITY AND HIGH RATE OF TEMPERATURE CHANGE THERMAL REFERENCE SOURCES

CROSS REFERENCE TO RELATED APPLICATIONS

The present application is a divisional application of U.S. patent application Ser. No. 14/884,459 filed on Oct. 15, 2015, the contents of which are incorporated by reference herein in their entirety.

BACKGROUND

The present disclosure relates to thin-film devices for generating a radiation spectrum and, in particular, to a method and apparatus for measuring a temperature corresponding to the radiation spectrum at the thin-film device.

In various optical systems, an optical signal is received from an object at an optical sensor and measurements of the optical signal are obtained at the optical sensor to determine a property of the object. In order to obtain accurate measurements, it is often necessary to calibrate the optical sensor using a known photon flux at one or more standard wavelengths. One method for providing a photon flux at a standard wavelength includes heating one or more blackbody radiators to selected temperatures and using an optical filter to select a calibration wavelength. However, the use of traditional blackbody sources to calibrate an optical sensor introduces size, weight, and power (SWaP) challenges. Thin film devices have been used to create blackbody radiation spectra while overcoming these challenges. These thin-film devices tend to have extended radiative surfaces, such as 10 centimeters (cm) by 10 cm. Effective calibration requires a temperature profile along the radiative surface that is uniform to within about 0.5 degrees kelvin. Therefore, it is desirable to measure temperature at the radiative surface. However, temperature sensors tend to alter local temperatures due to their thermal mass and conductivity, thereby affecting temperature uniformity across the radiative surface. The present disclosure provides a method and apparatus for measuring temperature of a thin-film blackbody source without substantially affecting the uniformity of the temperature at the radiative surface.

SUMMARY

According to one embodiment of the present disclosure, a thin-film device for generating a blackbody spectrum is disclosed, the device including: a first layer configured to generate heat in response to an applied voltage; a second layer configured to generate the blackbody radiation spectrum in response to the heat from the first layer; and a thermocouple between the first layer and the second layer for measuring a temperature at the second layer.

According to another embodiment of the present disclosure, a method for generating a blackbody radiation spectrum is disclosed, the method including: providing a thin-film device having a first layer of material configured to generate heat in response to an applied voltage, a second layer of material configured to generate the blackbody radiation spectrum in response to the heat from the first layer, and a thermocouple between the first layer and the second layer for measuring a temperature at the second layer; supplying a current through the first layer to generate heat in the first layer; using the thermocouple layer to measure the temperature at the second layer; and controlling the current at the first layer to provide a selected temperature of the second layer for generating the blackbody radiation spectrum.

According to yet another embodiment, a device for measuring a temperature is disclosed, the device including: a thin film layer of carbon nanotube material including a main body for disposition at a first location having a first temperature and a carbon nanotube tail extending from the main body, wherein an end of the carbon nanotube tail distal from the main body is disposed at a second location having a second temperature to form a reference junction; and an electrode having a junction end coupled to the main body of the carbon nanotube material and a contact end away from the main body of the carbon nanotube material.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
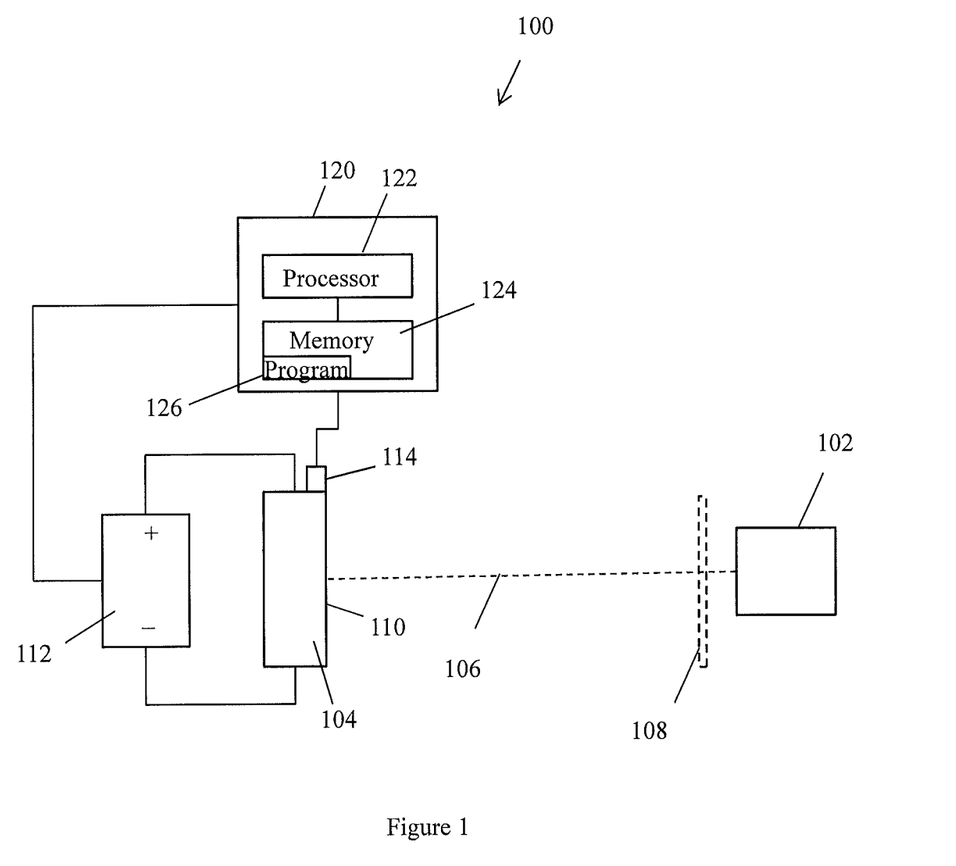
FIG. 1 shows an illustrative optical system for calibrating an optical sensor in one embodiment of the present disclosure.

FIG. 1 shows an illustrative optical system 100 for calibrating an optical sensor 102, such as an optical sensor or optical detector, in one embodiment of the present disclosure. The optical system 100 includes a thin-film device 104 that can be moved into and out of a line of sight 106 of the sensor 102. The thin-film device 104 provides light to the sensor 102 in the form of a blackbody radiation spectrum. The thin-film device 104 has a radiative surface 110 which is oriented to face toward the optical sensor 102. The radiative surface 110 is heated to a uniform temperature, thereby producing the blackbody radiation at the radiation surface 110. A filter 108 can be placed between the thin-film device 104 and the optical sensor 102 to allow a photon flux within a selected wavelength window to reach the optical sensor 102. The selected wavelength window generally corresponds to a calibration wavelength which is used to calibrate the optical sensor 102.

A power supply 112 supplies a current to the thin-film device 104 to heat the radiative surface 110 to the selected temperature. A thermocouple 114 is coupled to the radiative surface 110 in order to measure a temperature at the radiative surface 110. In an exemplary embodiment, the thermocouple 114 measures the temperature at a location as close to the radiative surface 110 as possible.

The optical system 100 includes a controller 120 for controlling various operations of the radiation source 104. The controller 120 includes a processor 122 and a memory storage device 124. In various embodiments, the memory storage device 124 includes a non-transitory memory storage device such as a solid-state memory storage device. A set of programs 126 may be stored in the memory storage device 124 that, when accessed by the processor 122, implement a method for controlling the radiative source 104. In one aspect, the controller 120 receives a temperature measurement from the thermocouple 114 and alters an amount of current supplied by the power source 112 to the radiation source based on the temperature measurement.

Figure 2:
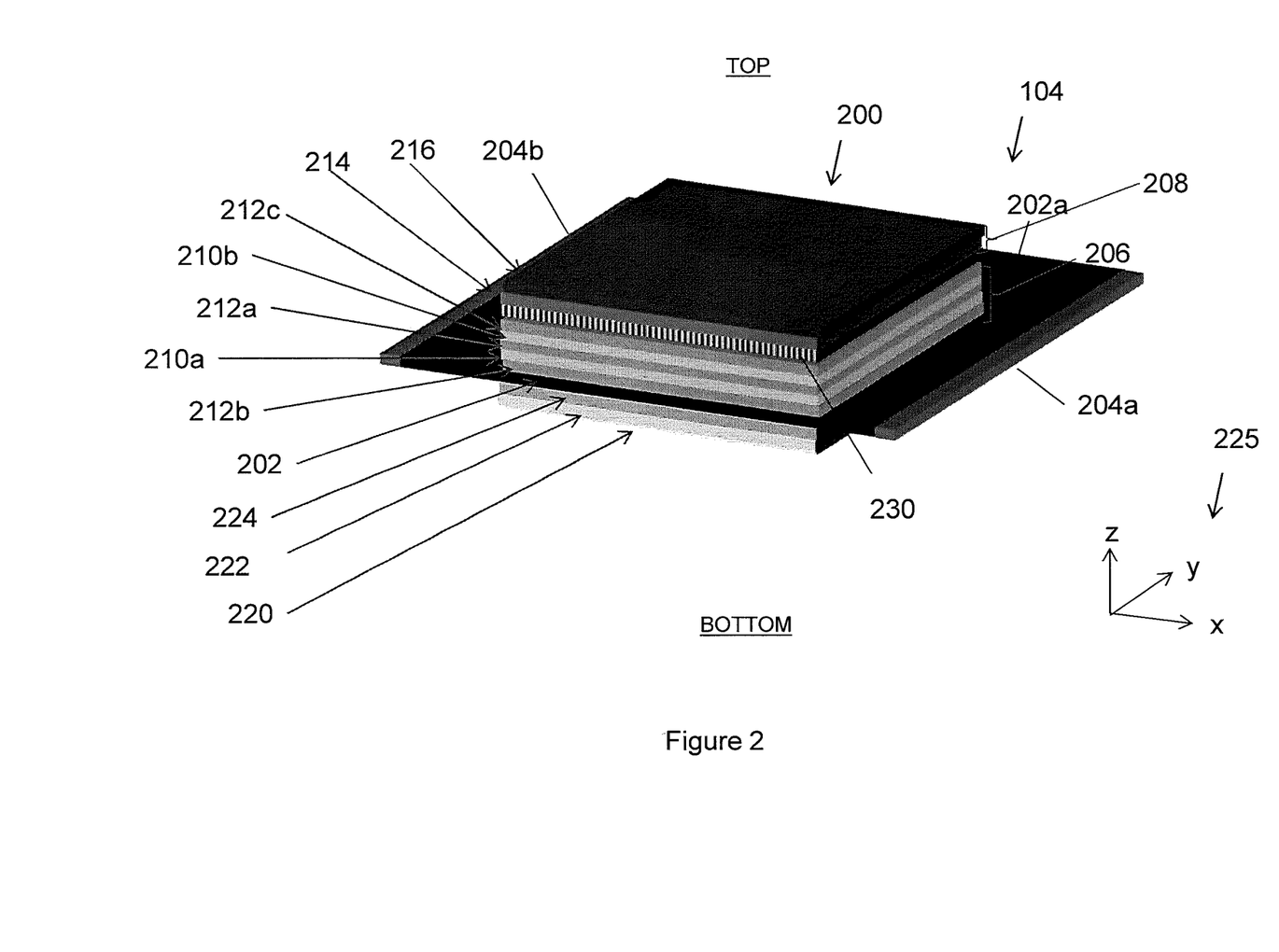
FIG. 2 shows a perspective view of an exemplary thin film device of the present disclosure in one embodiment.

FIG. 2 shows a perspective view of an exemplary thin film device 104 of the present disclosure in one embodiment. The thin-film device 104 includes a first layer 202 (also referred to herein as a "first carbon nanotube layer 202") having electrodes 204a, 204b at opposite ends of the first carbon nanotube layer 202. The electrodes 204a and 204b may be connected to a power supply (such as power supply 112 of FIG. 1) in order to supply a current that passes through the first carbon nanotube layer 202. A coordinate system 225 is provided in FIG. 2 for illustrative and explanatory purposes. The first carbon nanotube layer 202, as well as the other layers of the thin-film device 200, is considered to lie in the x-y plane of the coordinate system 225. The coordinate system 225 defines a top side or face of the thin-film structure 200 and a bottom side or face of the thin-film structure 200. For any given layer, the top side generally refers to the region in a positive z-direction with respect to the layer and the bottom side generally refers to the region in a negative z-direction with respect to the layer. The z-axis defines a longitudinal direction of the thin-film devices, while the plane perpendicular to the z-axis may be considered to be transverse to the longitudinal direction.

The first carbon nanotube layer 202 includes carbon nanotubes that are oriented in the plane of the first carbon nanotube layer 202. A thermal spreading layer 206 is disposed on the top face 202a of the first carbon nanotube layer 202. The thermal spreading layer 206 spreads heat transversely through the x-y plane as the heat travels along the z-axis from the first carbon nanotube layer 202. A thermocouple layer 230 is disposed on a top face of the thermal spreading layer 206. A second layer 208 (also referred to herein as a "second carbon nanotube layer 208") is adjoined to the thermocouple layer 230 so that the thermocouple layer 230 and the thermal spreading layer 206 are sandwiched between the first carbon nanotube layer 202 and the second carbon nanotube layer 208. The second carbon nanotube layer 208 includes a planar surface 214 that extends in the x-y plane and a plurality of carbon nanotubes 216 attached to a top of the planar surface 214 and oriented with their longitudinal axes aligned normal to the planar surface (i.e., oriented in the z-direction). In one embodiment, the planar surface 214 is a layer of alumina substrate ($Al_2O_3$). The second layer 208 forms the radiative surface 110 of FIG. 1.

When voltage is applied to the first carbon nanotube layer 202, heat is generated which flows out of either a top face 202a of the first carbon nanotube layer 202 or a bottom face 202b of the first carbon nanotube layer 202. The heat flowing from the top face 202a is transmitted through the thermal spreading layer 206 and the thermocouple layer 230 to reach the second carbon nanotube layer 208. At the second carbon nanotube layer 208, the heat excites photons from the plurality of carbon nanotubes 216, which photons are emitted in the positive z-direction to generate a blackbody radiation spectrum.

The spatial distribution of heat generated by the first layer 202 tends to vary within the x-y plane. As the heat travels in the +z direction, the thermal spreading layer 206 reduces this variation of heat within the x-y plane so that by the time the heat reaches the second carbon nanotube layer 208, the heat is evenly distributed across the surface of the second carbon nanotube layer 208. The structure of the thermal spreading layer 206 is selected so as to reduce variation of heat in the x-y direction.

In one embodiment, the thermal spreading layer 206 includes a plurality of thermally conductive layers for spreading the heat transversely throughout the x-y plane, producing an even distribution of heat in the x-y plane. In one embodiment, the thermally conductive layers include graphene sheets. A graphene sheet is a highly thermally anisotropic material and is effective in spreading the heat transversely in the x-y plane. In one embodiment, the thermal spreading layer 206 includes at least a first graphene sheet 210a and a second graphene sheet 210b and corresponding adhesive layers 212a-212c. While two graphene sheets are shown in FIG. 2, it is understood that any number of graphene sheets may be included in the thermal spreading layer 206. The adhesive layers 212a-212c are thermally insulating, although not necessarily thermally anisotropic, and allows for heat transfer along the z-axis. . The first graphene sheet 210a is joined to the first layer 202 via a first adhesive layer 212a. The second graphene sheet 210b and the first graphene sheet 201a are joined by adhesive layer 212b. The second graphene sheet 201b is joined to the thermocouple layer 208 via adhesive layer 212c.

The thin-film structure 200 further includes a reflector 220 disposed on the bottom face 202b of the first carbon nanotube layer 202. The reflector 220 is a metal layer that has low heat emittance so that very little heat escapes by radiation on the back side of the thin-film structure 200. In one embodiment, a graphene sheet 222 and adhesive layer 224 may be disposed between the first carbon nanotube layer 202 and the reflector 220.

Figure 3:
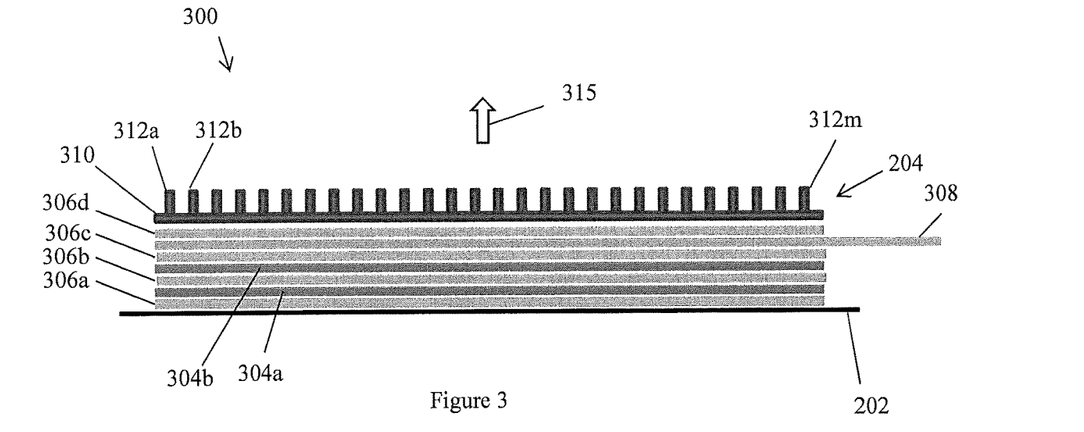
FIG. 3 shows a side view of a top portion of the exemplary thin film device of FIG. 2.

FIG. 3 shows a side view of a top portion of the exemplary thin film device 104 of FIG. 2, showing layers between the first layer 202 and the second layer 204. A first graphene sheet 304a is coupled to a top surface of the first layer 202 via an adhesive layer 306a. A second graphene sheet 304b is coupled to a top surface of the first graphene sheet 304a via adhesive layer 306b. The thermocouple layer 308 is coupled to the second graphene sheet 304b via adhesive layer 306c. The second layer 204 is coupled to the thermocouple layer 308 via adhesive layer 306d.

The second carbon nanotube layer 204 includes a thin surface 310 (generally an alumina surface) and plurality of carbon nanotubes 312a-312m oriented so that the longitudinal axes of the plurality of carbon nanotubes 312a-312m are oriented substantially normal to the planar surface of the thin alumina surface 310. In general, photons excited at the second carbon nanotube layer 204 are emitted into the half-space above the second carbon nanotube layer 204, as indicated by emission arrow 315. In various embodiments, the temperature at the second carbon nanotube layer 204 has a spatial variation of less than 1.0 Kelvin across the surface of the second carbon nanotube layer 204. In another embodiment, the spatial variation is less than 0.5 Kelvin. In yet another embodiment, the spatial variation is less than 0.1 Kelvin. Thus, each of the plurality of carbon nanotubes 312a-312m at the second carbon nanotube layer 306 receives substantially a same amount of heat from the alumina surface 310.

Figure 4:
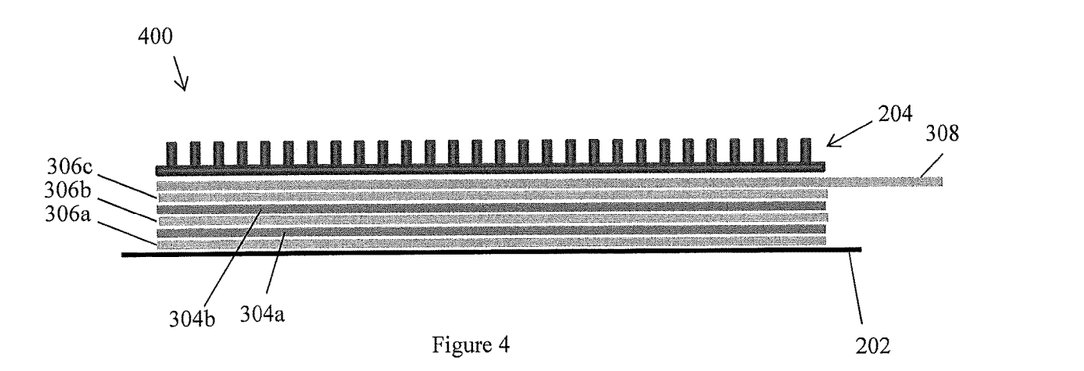
FIG. 4 shows a side view of a top portion of the thin-film device in an alternate embodiment.

FIG. 4 shows a side view of a top portion of the thin-film device 104 in an alternate embodiment. The first graphene sheet 304a is coupled to a top surface of the first layer 202 via an adhesive layer 306a. A second graphene sheet 304b is coupled to a top surface of the first graphene sheet 304a via adhesive layer 306b. The thermocouple layer 308 is coupled to the second graphene sheet 304b via adhesive layer 306c. The thermocouple layer 308 is in direct contact with the second layer 204 (i.e., without an intervening adhesive layer).

Figure 5:
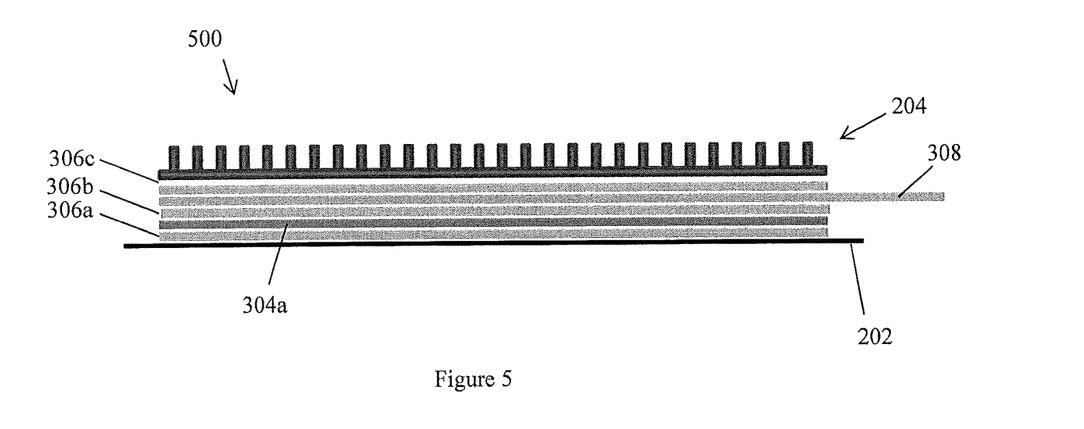
FIG. 5 shows a side view of a top portion of the thin-film device in an alternate embodiment.

FIG. 5 shows a side view of a top portion of the thin-film device 104 in an alternate embodiment. The first graphene sheet 304a is coupled to a top surface of the first layer 202 via an adhesive layer 306a. The thermocouple layer 308 is coupled to the first graphene sheet 304a via adhesive layer 306b. The second layer 208 is coupled to the thermocouple layer 308 via the adhesive layer 306c.

Figure 6:
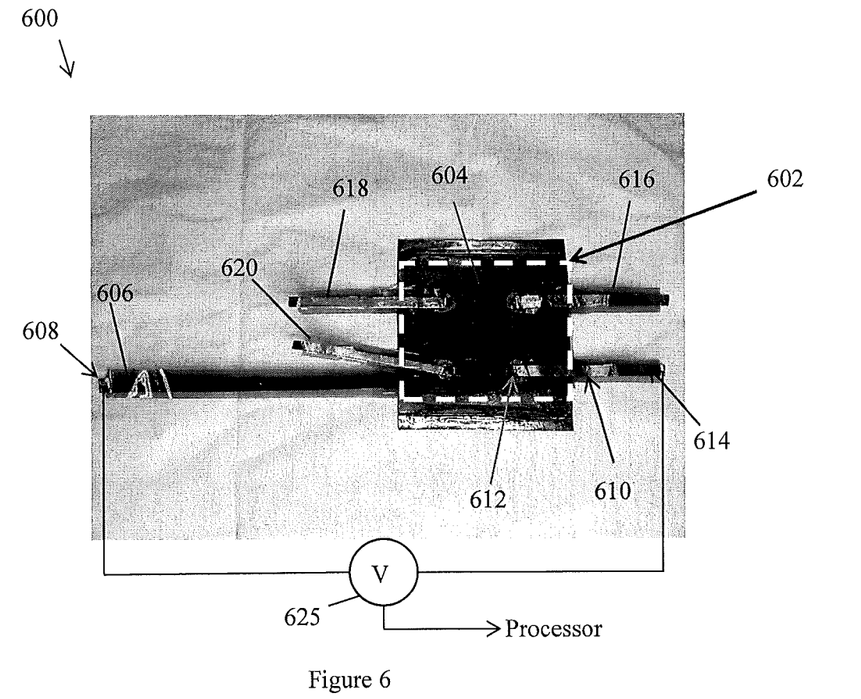
FIG. 6 shows an exemplary thermocouple forming a thermocouple layer of the thin-film device in one embodiment of the invention.

FIG. 6 shows an exemplary thermocouple 600 forming a thermocouple layer of the thin-film device 104 in one embodiment of the invention. The exemplary thermocouple 600 includes a thin film layer having x- and y-dimensions the same as the x- and y-dimensions of the other layers of the thin-film electrode so as to be integrated as a layer of the thin-film device 104. In one embodiment, the main body 604 borders or is adjacent to the second layer 208. The thermocouple 600 is generally a thin sheet having a thickness of a few mils so as to cause few or no spatial temperature differences at the second layer 208. In one embodiment, the width of the thermocouple 600 is about 1.5 mils.

The illustrative thermocouple 600 is a copper-CNT thermocouple. The copper-CNT thermocouple includes a carbon nanotube thin film 602 having a main body 604 and a CNT tail 606. The main body 604 has a length and width (x- and y-directions) that is the same length and width as the other layers of the thin-film device 104. The CNT tail 606 forms a strip of material that extends away from the main body 604. A copper electrode is attached to the CNT tail 606 at a location away from the main body 604, thereby forming a reference junction 608. A copper electrode 610 is attached to the main body 604 at a selected location. The thickness of the electrode 610 is about 1 mil and its cross-sectional area is small. Thus, the electrode 610 has little thermal mass so as not to disrupt the transverse temperature uniformity at the second layer. The copper electrode 610 includes a junction end 612 and a contact end 614 that is distal from the junction end 612. The junction end 612 is affixed to the main body 604. In one embodiment, the junction end 612 is affixed to the main body 604 via electroless deposition. The distal end of the CNT tail 606 (i.e., reference end 608) and the contact end 614 of the copper electrode 610 are substantially at ambient or room temperature. Meanwhile, the main body 604 of the CNT and the junction end 612 of the copper electrode 610 are at a temperature of the second layer 208 of the thin-film device 104. In various embodiments, the copper electrode 610 and the contact end 614 can be thermally and electrically insulated via an insulating material 620.

Temperature measurements can be obtained by placing a voltmeter 625 across the contact end 614 of the copper electrode 610 and the distal reference junction 608 of the CNT tail 606. Voltage measurements can be sent to the control system (120, FIG. 1) which can then raise or lower the temperature of the second layer by either increasing or decreasing, respectively, a current through the thin-film device (104, FIG. 1). In one embodiment, the control system (120, FIG. 1) compares the temperature measurement to a selected or desired temperature and alters the current accordingly.

In one embodiment, a single copper electrode 610 is attached to the main body 604. However, any number of copper electrodes may be attached to the main body in various embodiments. As shown in FIG. 6, four copper electrodes 610, 616, 618, 620 are attached to the main body 604. The locations of the copper electrodes 610, 616, 618, 620 can be selected in order to obtain a temperature profile at various points across a surface of the second layer 208. The temperature at each point is monitored relative to the common reference junction 606.

Figure 7:
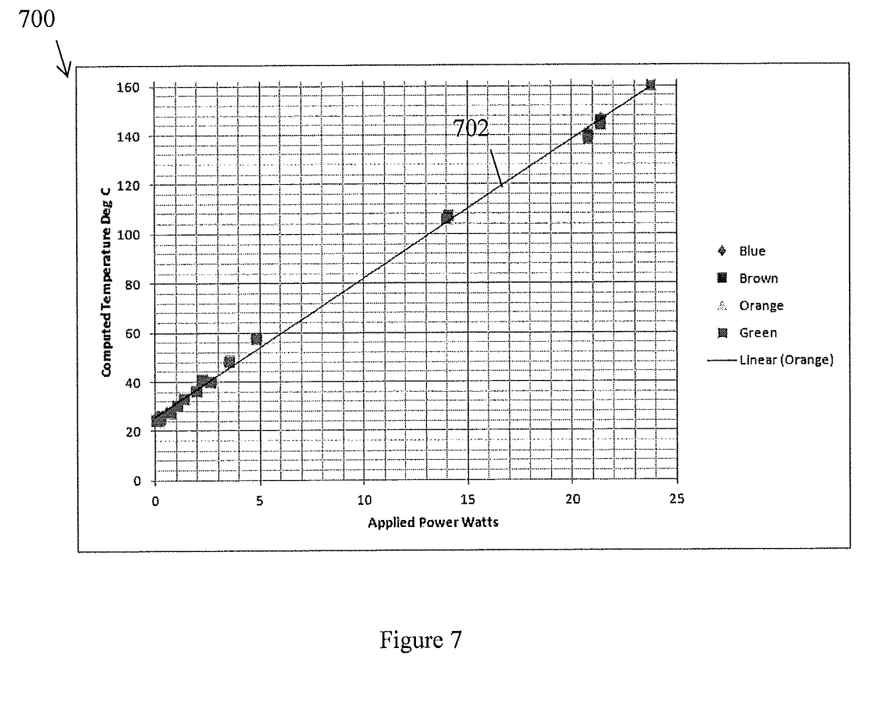
FIG. 7 shows a graph of temperature at the second layer and applied power from the power supply.

FIG. 7 shows a graph 700 of temperature at the second layer 208 and applied power from the power supply 112. The graph 700 shows data points from each of the electrodes 610, 616, 618, 620 (listed on the graph as blue, brown orange and green respectively) of FIG. 6. A best-fit line 702 is drawn through the data points. Good agreement is seen between the overlapping temperature measurements at the various electrode contact locations.

Figure 8:
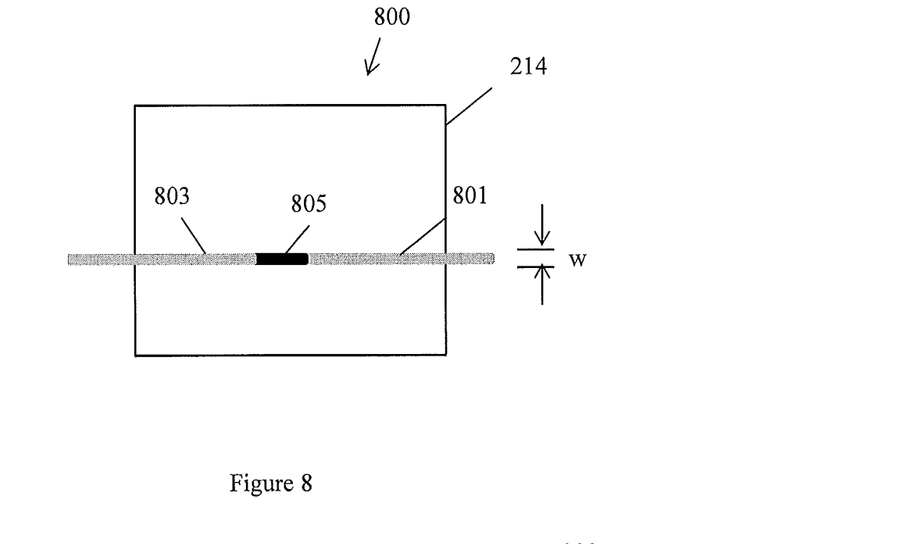
FIG. 8 shows an alumel-chromel thermocouple in another embodiment of the present disclosure.

FIG. 8 shows an alumel-chromel thermocouple 800 in another embodiment of the present disclosure. The alumel-chromel thermocouple 800 may be formed via vapor deposition, usually in a vacuum, of alumel and chromel on the alumina substrate layer 214 of the second carbon layer 208. Vapor deposition and/or electroplating with masking allows good control of electrode width and thickness. The layers of alumel and chromel are from about 1 to 3 mils in thickness. In one embodiment, the layers of alumel and chromel are from 1 mil in width, however other widths may be used as discussed below with respect to FIG. 9. The small width of the layers contributes very little thermal mass and therefore provides very little disruption of the temperature uniformity required at the second layer. A thin strip of alumel 801 is formed at one location while a thin strip of chromel 803 is formed at another location. In region 805, the alumel 801 and the chromel 803 overlap to form a junction. Thermocouple 800 is described as an alumel-chromel thermocouple for illustrative purposes only and not as a limitation of the invention. In other embodiments, the thermocouple can be made of depositing other suitable metal alloys on the alumina substrate layer 214 (i.e. Fe: Constantan, Cu: Constantan).

Figure 9:
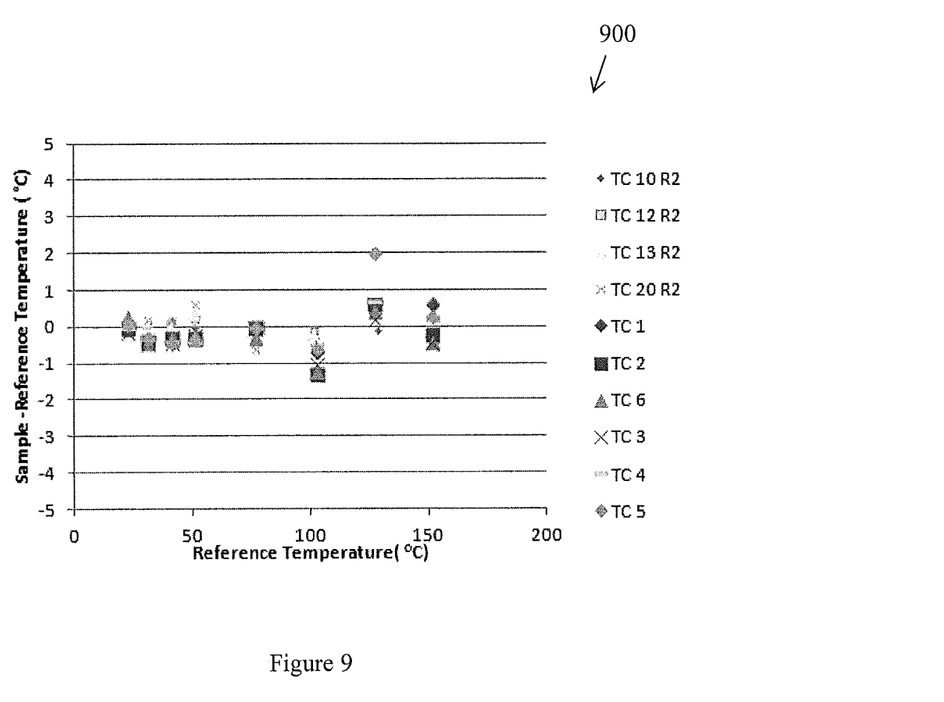
FIG. 9 shows a graph of temperature error versus temperature for alumel-chromel thermocouples having various cross-sectional widths.

FIG. 9 shows a graph 900 of temperature error versus temperature for alumel-chromel thermocouples having various cross-sectional widths. The ordinate axis displays a difference between the reference temperature and a sample temperature measured by the thermocouple, while the abscissa shows reference temperatures. The thermocouples have widths from about 10 mils to about 125 mils. Reference temperatures were about 25° C., 30° C., 40° C., 50° C., 75° C., 100° C., 125° C. and 150° C. The graph 900 shows that the thermocouples at the various widths provide a good reading of the reference temperature to within about 1 degree K and in most instances within about 0.5 degree K.

Although this implies that "large" width thermocouples may be used, it may still be desired to use thermocouples having smaller widths.

Therefore, in one aspect a thin-film device for generating a blackbody spectrum is disclosed, the device including: a first layer configured to generate heat in response to an applied voltage; a second layer configured to generate the blackbody radiation spectrum in response to the heat from the first layer; and a thermocouple between the first layer and the second layer for measuring a temperature at the second layer. In one embodiment, the thermocouple further includes a copper-carbon nanotube thermocouple layer. The copper-carbon nanotube thermocouple layer can include a carbon nanotube material having a main body proximate the second layer and a carbon nanotube tail and a copper electrode having a junction end affixed to the main body of the carbon nanotube material and a contact end distal from the main body of the carbon nanotube material. In one embodiment, the copper electrode includes a plurality of copper electrodes and each copper electrode includes a junction end affixed to the main body of the carbon nanotube material and a contact end distal from the main body of the carbon nanotube material, wherein the thermocouples measure temperatures at various locations of the second layer. In another embodiment, the thermocouple layer includes a strip of alumel deposited on the second layer and a strip of chromel deposited on the second layer and one end of the strip of alumel is in contact one end of the strip of chromel. In various embodiments, the thermocouple produces a local variation of the temperature at the second layer of less than about +−0.1 kelvin. A thermal spreading layer may be located between the first layer and the second layer so that the thermocouple is between the thermal spreading layer and the second layer. A voltmeter may be used to measure a voltage difference across the thermocouple to determine the temperature at the second layer. A controller may be used to control a current through the first layer in response to the determined temperature.

In another aspect, a method for generating a blackbody radiation spectrum is disclosed, the method including: providing a thin-film device having a first layer of material configured to generate heat in response to an applied voltage, a second layer of material configured to generate the blackbody radiation spectrum in response to the heat from the first layer, and a thermocouple between the first layer and the second layer for measuring a temperature at the second layer; supplying a current through the first layer to generate heat in the first layer; using the thermocouple layer to measure the temperature at the second layer; and controlling the current at the first layer to provide a selected temperature of the second layer for generating the blackbody radiation spectrum. In one embodiment, the thermocouple includes a copper-carbon nanotube thermocouple. The copper-carbon nanotube thermocouple includes carbon nanotube material forming a main body proximate the second layer and a carbon nanotube tail having an reference junction distal from the second layer and includes a copper electrode having a junction end affixed to the main body a contact end distal from the main body, and the temperature is related to a voltage difference between the reference junction of the carbon nanotube tail and the contact end of the copper electrode. In another embodiment, the thermocouple includes a strip of alumel deposited on the second layer and a strip of chromel deposited on the second layer, wherein an end of the strip of alumel is in contact with an end of the strip of chromel. The thermocouple is may be used to measure the temperature at the second layer while providing a local variation of the temperature at the second layer of less than about +−0.5 kelvin. In one embodiment, the second layer includes a planar surface and a plurality of carbon nanotubes, wherein a selected carbon nanotube has a longitudinal axis directed substantially normal to the planar surface and emits photons directed along the longitudinal axis in response to the heat from the first layer. A graphene stack may be used to spread the heat from the first layer transversely between the first layer and the thermocouple.

In yet another embodiment, a device for measuring a temperature is disclosed, the device including: a thin film layer of carbon nanotube material including a main body for disposition at a first location having a first temperature and a carbon nanotube tail extending from the main body, wherein an end of the carbon nanotube tail distal from the main body is disposed at a second location having a second temperature to form a reference junction; and an electrode having a junction end coupled to the main body of the carbon nanotube material and a contact end away from the main body of the carbon nanotube material. A temperature measurement is obtained at a coupling location of the junction end of the electrode and the main body of the carbon nanotube material. The electrode may include a plurality of electrodes, each having a junction end coupled to the main body of the carbon nanotube material and a contact end distal away from the main body. In one embodiment a width of the electrode is less than about 1 mil. The electrode may be affixed to the main body by either electrical deposition or electroless deposition.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A device for measuring a temperature, comprising:
   a thin film layer of carbon nanotube material including a
      main body for disposition at a first location having a first temperature and a carbon nanotube tail extending from the main body, wherein an end of the carbon nanotube tail distal from the main body is disposed at a second location having a second temperature to form a reference junction;

an electrode having a junction end coupled to the main body of the carbon nanotube material and a contact end away from the main body of the carbon nanotube material; and a voltmeter across the contact end of the electrode and the distal end of the carbon nanotube tail to measure a voltage indicative of the first temperature.

2. The device of claim 1, wherein a temperature measurement is obtained at a coupling location of the junction end of the electrode and the main body of the carbon nanotube material.

3. The device of claim 1, wherein the electrode further comprises a plurality of electrodes, each having a junction end coupled to the main body of the carbon nanotube material and a contact end distal away from the main body.

4. The device of claim 1, wherein a thickness of the electrode is less than about 1 mil.

5. The device of claim 1, wherein the electrode is affixed to the main body by one of: (i) electrical deposition and (ii) electroless deposition.

* * * * *